United States Patent
Inagaki et al.

(10) Patent No.: US 7,397,981 B2
(45) Date of Patent: *Jul. 8, 2008

(54) APPARATUS AND METHOD OF COMPENSATING FOR WAVELENGTH DISPERSION OF OPTICAL TRANSMISSION LINE

(75) Inventors: Shinya Inagaki, Kawasaki (JP); Hisashi Takamatsu, Kanagawa (JP); Kazuo Yamane, Kawasaki (JP); Takashi Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/823,634

(22) Filed: Apr. 14, 2004

(65) Prior Publication Data

US 2004/0208434 A1  Oct. 21, 2004

Related U.S. Application Data

(62) Division of application No. 09/753,573, filed on Jan. 4, 2001, now Pat. No. 6,744,958.

(30) Foreign Application Priority Data

Jan. 11, 2000  (JP)  ............................. 2000-002655

(51) Int. Cl.
*G02B 6/26* (2006.01)
(52) U.S. Cl. .............................. 385/27; 385/15; 385/24
(58) Field of Classification Search ................... 385/15, 385/24, 27, 123–127
See application file for complete search history.

(56) References Cited

U.S. PATENT DOCUMENTS

| | | | |
|---|---|---|---|
| 5,568,583 A | 10/1996 | Akasaka et al. | |
| 5,673,354 A | 9/1997 | Akasaka et al. | |
| 5,793,917 A * | 8/1998 | Yoshimura | 385/100 |
| 5,838,849 A | 11/1998 | Shirasaki | |
| 5,930,045 A | 7/1999 | Shirasaki | |
| 5,956,440 A | 9/1999 | Mikami et al. | |
| 5,969,865 A | 10/1999 | Shirasaki | |
| 5,969,866 A | 10/1999 | Shirasaki | |
| 5,973,838 A | 10/1999 | Shirasaki | |
| 5,982,488 A | 11/1999 | Shirasaki | |
| 5,995,694 A | 11/1999 | Akasaka et al. | 385/123 |
| 5,999,320 A | 12/1999 | Shirasaki | |
| 6,009,221 A | 12/1999 | Tsuda | |
| 6,031,955 A | 2/2000 | Mukasa et al. | |

(Continued)

FOREIGN PATENT DOCUMENTS

EP  0732819  9/1996

(Continued)

OTHER PUBLICATIONS

M. Shirasaki, "Chromatic Dispersion Compensation Using Virtually Imaged Phased Array", Optical Amplifiers and Their Applications, Paper PDP-8, Jul. 1997.

(Continued)

*Primary Examiner*—Jennifer Doan
(74) *Attorney, Agent, or Firm*—Staas & Halsey LLP

(57) ABSTRACT

Both wavelength dispersion and a dispersion slope of a line fiber are simultaneously compensated for by combining two types of dispersion compensators having different characteristics.

13 Claims, 17 Drawing Sheets

U.S. PATENT DOCUMENTS

| | | | |
|---|---|---|---|
| 6,181,449 B1 * | 1/2001 | Taga et al. | 398/9 |
| 6,253,005 B1 * | 6/2001 | Bergmann et al. | 385/33 |
| 6,311,002 B1 | 10/2001 | Evangelides et al. | |
| 6,393,188 B1 | 5/2002 | Jeong et al. | |
| 6,744,958 B2 * | 6/2004 | Inagaki et al. | 385/123 |
| 6,941,037 B2 * | 9/2005 | Georges | 385/24 |

FOREIGN PATENT DOCUMENTS

| | | |
|---|---|---|
| EP | 0902558 | 3/1999 |
| EP | 1 049275 A1 | 11/2000 |
| JP | 9-23187 | 1/1997 |
| JP | A-09-043057 | 2/1997 |
| JP | 10-73738 | 3/1998 |
| JP | 11-88260 | 3/1999 |
| JP | 2001-53679 | 2/2001 |
| WO | WO 98/35259 | 8/1998 |
| WO | WO 99/09448 | 2/1999 |
| WO | WO 99/30445 | 6/1999 |

OTHER PUBLICATIONS

Communication (Decision of Rejection) for Japanese Patent Application No. 2000-002655 dated Feb. 7, 2006.

Rejection Ground for Japanese Patent Application No. 2000-002655 dated Nov. 1, 2005.

* cited by examiner

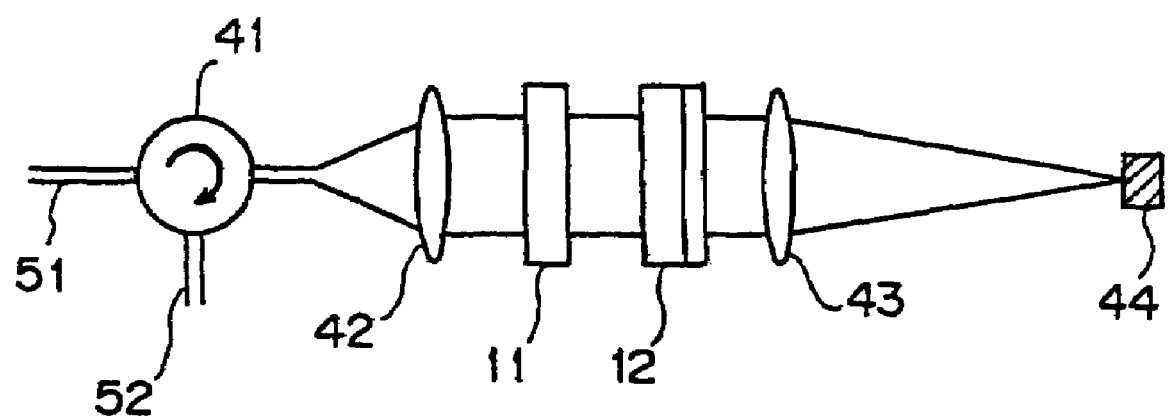
F I G. 3

US 7,397,981 B2

APPARATUS AND METHOD OF COMPENSATING FOR WAVELENGTH DISPERSION OF OPTICAL TRANSMISSION LINE

This application is a divisional of application Ser. No. 09/753,573, filed Jan. 4, 2001, now U.S. Pat. No. 6,744,958.

CROSS-REFERENCE TO RELATED APPLICATIONS

This application is based on, and claims priority to, Japanese Application No. 2000-002655, filed Jan. 11, 2000, and which is incorporated herein by reference.

BACKGROUND OF THE INVENTION

1. Field of the Invention

The present invention relates to a dispersion compensation apparatus and method for compensating for the wavelength dispersion of an optical fiber in a wavelength division multiplexing (WDM) optical transmission system.

2. Description of the Related Art

In a conventional WDM optical transmission system, a fiber-type dispersion compensator referred to as a dispersion compensation fiber (DCF) is well known as a technology of compensating for the wavelength dispersion of a line fiber forming an optical transmission line. A DCF indicates dispersion having a sign inverse to that of the line fiber, and can thereby compensate for the dispersion of the line fiber. Since the amount of compensation provided by a DCF is proportional to the fiber length of the DCF, it is necessary to adjust the fiber length of the DCF depending on the dispersion of a target line fiber.

DCFs are produced by manufacturers at intervals of a fixed, specific amount of dispersion (for example, 100 ps/nm). Unfortunately, the actual amount of dispersion of a line fiber is typically not an even multiple of these intervals, thereby causing a setting error of the amount of compensation. As a result, it is very difficult to completely compensate for the wavelength dispersion of a line fiber using DCFs currently available on the market.

Furthermore, wavelength dispersion of a line fiber is wavelength-dependent, and is known to have a characteristic referred to as a dispersion slope. The dispersion slope corresponds to the inclination of the dispersion-to-wavelength graph linear-approximated in a wavelength area used for a signal light.

A DCF has a dispersion slope having a sign inverse to that of a line fiber. Based on this, the dispersion slope of the line fiber can be partially compensated for. However, since the dispersion slope of the DCF is proportional to the fiber length, both wavelength dispersion and dispersion slope of the line fiber cannot be compensated for using a DCF of a fixed length.

SUMMARY OF THE INVENTION

Accordingly, it is an object of various embodiments of the present invention to provide a dispersion compensation apparatus and method for compensating for wavelength dispersion and dispersion slope, and for reducing the setting error of the amount of the compensation of wavelength dispersion in a WDM optical transmission system.

Objects of the present invention are achieved by providing an apparatus including (a) a first compensation device compensating for a wavelength dispersion-characteristic dependent on wavelength; and (b) a second compensation device compensating for wavelength dispersion, the second compensation device having a constant wavelength dispersion characteristic over a plurality of wavelengths.

Objects of the present invention are also achieved by providing an apparatus including (a) a first compensation device compensating for a wavelength dispersion characteristic dependent on wavelength; and (b) a second compensation device compensating for wavelength dispersion, the second compensation device having a variable wavelength dispersion characteristic.

In addition, objects of the present invention are achieved by providing an apparatus including (a) a fiber type compensation device compensating for wavelength dispersion and dispersion slope of an optical transmission line; and (b) a virtually imaged phased array (VIPA) type compensation device compensating for a sum of the wavelength dispersion of the optical transmission line and the wavelength dispersion compensation of the fiber type compensation device.

Moreover, objects of the present invention are achieved by providing an optical transmission system including (a) an optical transmission line, light traveling through the optical transmission line; (b) a first compensation device compensating for dispersion slope of the optical transmission line, the first compensation device having a wavelength dispersion characteristic dependent on wavelength; and (c) a second compensation device compensating for wavelength dispersion of the optical transmission line, the second compensation device having a constant wavelength dispersion characteristic over a plurality of wavelengths.

Further, objects of the present invention are achieved by providing an optical transmission system including (a) an optical transmission line, light traveling through the optical transmission line; (b) a first compensation device compensating for dispersion slope of the optical transmission line, the first compensation device having a wavelength dispersion characteristic dependent on wavelength; and (c) a second compensation device compensating for wavelength dispersion of the optical transmission line, the second compensation device having a variable wavelength dispersion characteristic.

Objects of the present invention are also achieved by providing a method including (a) transmitting a light through an optical transmission line; (b) compensating for dispersion slope of a wavelength dispersion characteristic dependent on wavelength; and (c) compensating for wavelength dispersion of a constant wavelength dispersion characteristic over a plurality of wavelengths.

Objects of the present invention are further achieved by providing a method including (a) transmitting a light through an optical transmission line; (b) compensating for dispersion slope of a wavelength dispersion characteristic dependent on wavelength; and (c) compensating for wavelength dispersion of a variable wavelength dispersion characteristic.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 shows a VIPA type compensator.

DESCRIPTION OF THE PREFERRED EMBODIMENTS

Figure 1:
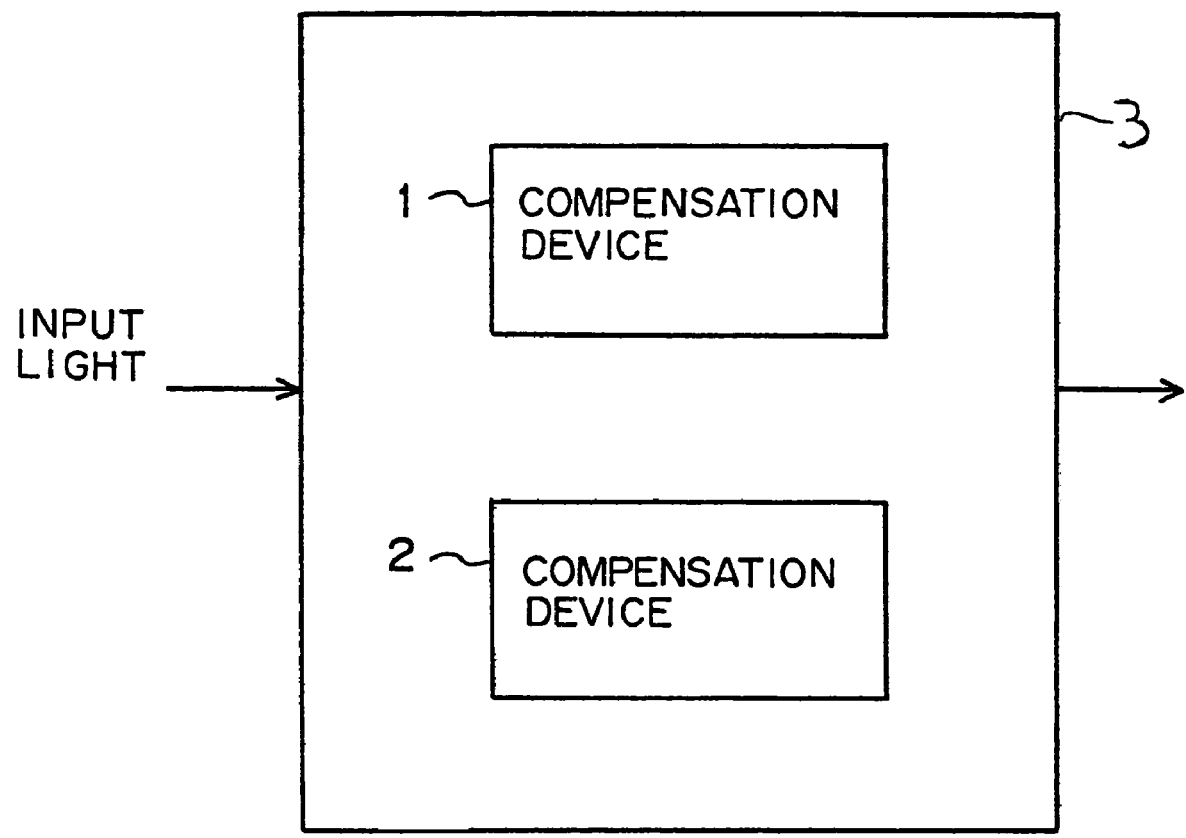
FIG. 1 shows a principle of the present invention.

Reference will now be made in detail to the present preferred embodiments of the present invention, examples of which are illustrated in the accompanying drawings, wherein like reference numerals refer to like elements throughout.

FIG. 1 shows a principle of a dispersion compensation apparatus according to the present invention. The dispersion compensation apparatus shown in FIG. 1 comprises compensation devices 1 and 2, and compensates for the wavelength dispersion of an optical transmission line such as a line fiber.

According to an embodiment of the present invention, the compensation device 1 has the wavelength dispersion characteristic depending on a wavelength, and compensates for the dispersion slope of the transmission line. The compensation device 2 has a constant wavelength dispersion characteristic for a plurality of wavelengths, and compensates for the wavelength dispersion of the transmission line.

The compensation device 1 is, for example, a fiber type compensator such as a DCF, has a characteristic of a dispersion slope, etc. depending on a wavelength, and cancels the dispersion slope of the transmission line. The compensation device 2 has a constant wavelength dispersion characteristic for a plurality of different wavelengths contained in a wavelength area for which the compensation device 1 compensates, and cancels the remaining wavelength dispersion when the wavelength dispersion obtained by summing the wavelength dispersion of the transmission line and the wavelength dispersion of the compensation device 1 does not indicate zero.

In some embodiments of the present invention, compensation devices 1 and 2 might, for example, be housed in the same enclosure 3. Then, for example, the enclosed components might be marketable as a single unit. However, various embodiments of the present invention do not require that compensation devices 1 and 2 are in the same housing. For example, in FIG. 12 (discussed later), the different compensation devices would not likely be housed in the same enclosure.

With the above-described configuration, the wavelength dispersion and the dispersion slope of a line fiber can be simultaneously compensated for, and the setting error of the amount of compensation can be reduced if the wavelength dispersion of the compensation device 2 indicates an appropriate value.

According to an additional embodiment of the present invention, the compensation device 1 has a wavelength dispersion characteristic depending on a wavelength, and compensates for the dispersion slope of the transmission line. The compensation device 2 has a variable wavelength dispersion characteristic, and compensates for the wavelength dispersion of the transmission line. When the wavelength dispersion obtained by summing the wavelength dispersion of the transmission line and the wavelength dispersion of the compensation device 1 does not indicate zero, the wavelength dispersion of the compensation device 2 is appropriately adjusted, and the remaining wavelength dispersion is canceled.

With this configuration, the wavelength dispersion and the dispersion slope of a line fiber can be simultaneously compensated for, and the setting error of the amount of compensation can be reduced if the wavelength dispersion of the compensation device 2 can be adjusted to an appropriate value.

Figure 9:
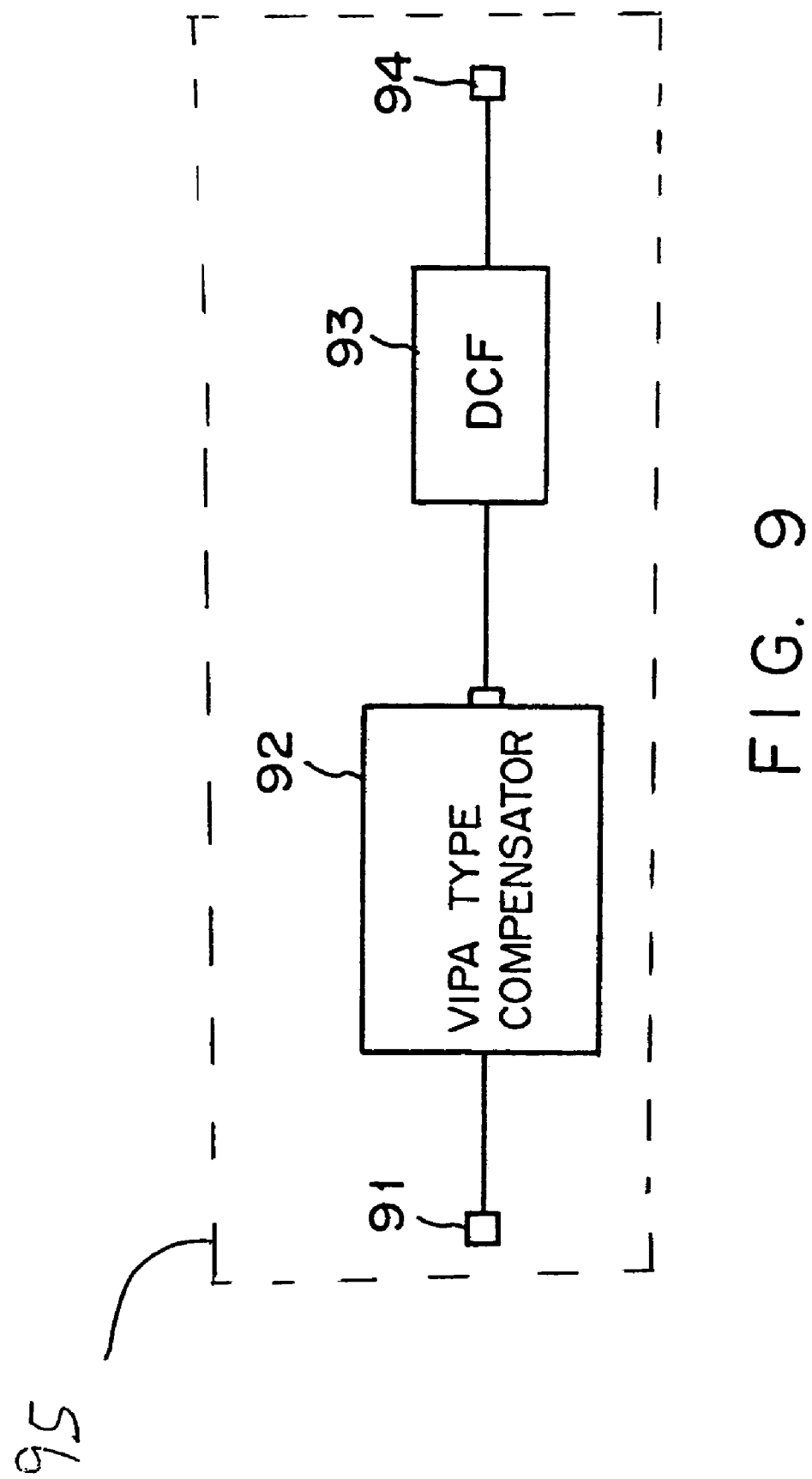
FIG. 9 shows a dispersion compensation apparatus.
Figure 12:
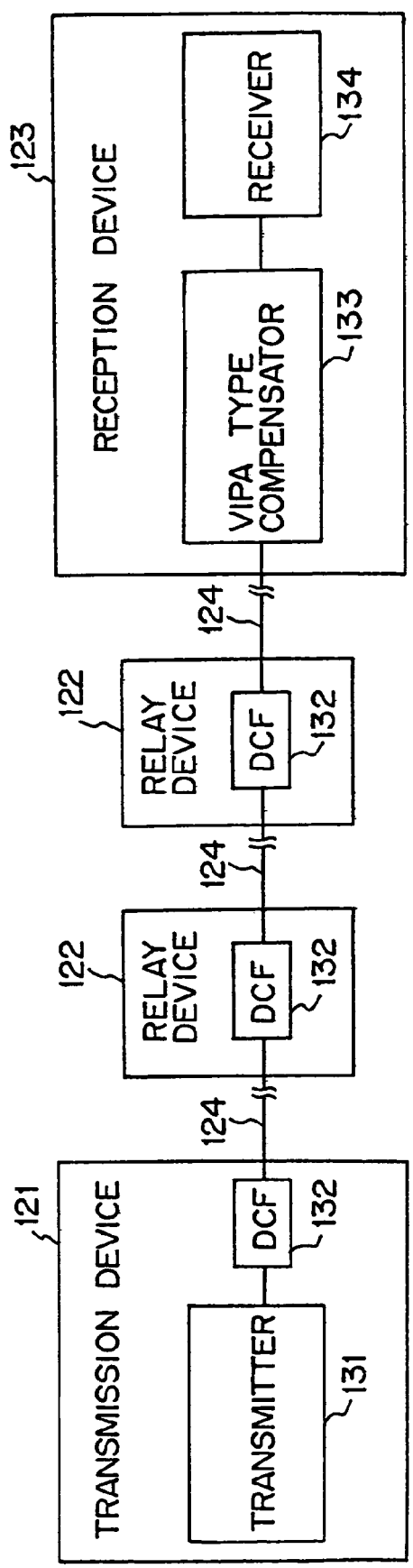
FIG. 12 shows an optical transmission system.

For example, the compensation device 1 shown in FIG. 1 corresponds to a DCF 93 shown in FIG. 9 and a DCF 132 shown in FIG. 12, and the compensation device 2 shown in FIG. 1 corresponds to a virtually imaged phased array type compensator 92 shown in FIG. 9 and a virtually imaged phased array type compensator 133 shown in FIG. 12.

According to embodiments of the present embodiment, the dispersion slope and the wavelength dispersion are simultaneously compensated for by combining the first compensator mainly for compensating for a dispersion slope with the second compensator mainly for compensating for wavelength dispersion.

As the first compensator, for example, the above mentioned fiber type compensator is used. Here, a "fiber type compensator" refers to a dispersion compensator having a fiber through which light travels to provide the compensation. As the second compensator, for example, a virtually imaged phased array (VIPA) type compensator is used.

A VIPA is an optical branching filter capable of generating a large angular dispersion from input light, and a VIPA type compensator using the branching filter can generate a wide range of positive and negative wavelength dispersion.

A VIPA is described in detail in "Wavelength Branching Filter," Japanese Patent Application Laid-Open 09-043057, which is incorporated herein by reference. A VIPA type compensator is described in detail in (a) "Optical Device using Virtually Imaged Phased Array for Generating Chromatic Dispersion," Japanese Patent Application 10-534450, and International Publication Number for PCT Application WO98/35259; (b) "Optical Device using VIPA for Chromatic Dispersion," Japanese Patent Application 11-513133, and International Publication Number for PCT Application WO99/09448; and (c) "Chromatic Dispersion Compensation Using Virtually Imaged Phased Array," M. Shirasaki, Optical Amplifiers and Their Applications, Paper PDP-8, July 1997, all of which are incorporated herein by reference.

Moreover, a VIPA and a VIPA type compensator are described in (a) U.S. application Ser. No. 09/576,541, filed May 23, 2000; (b) U.S. application Ser. No. 09/461,277, filed Dec. 14, 1999; (c) U.S. application Ser. No. 08/796,842, filed Feb. 7, 1997; (d) U.S. application Ser. No. 08/685,362, filed Jul. 24, 1996; and (e) U.S. application Ser. No. 08/910,251, filed Aug. 13, 1997; all of which are incorporated herein by reference.

A "VIPA type compensator" as described herein refers to a device which used a VIPA to compensate for dispersion as described, for example, in the various documents incorporated herein by reference.

Figure 2:
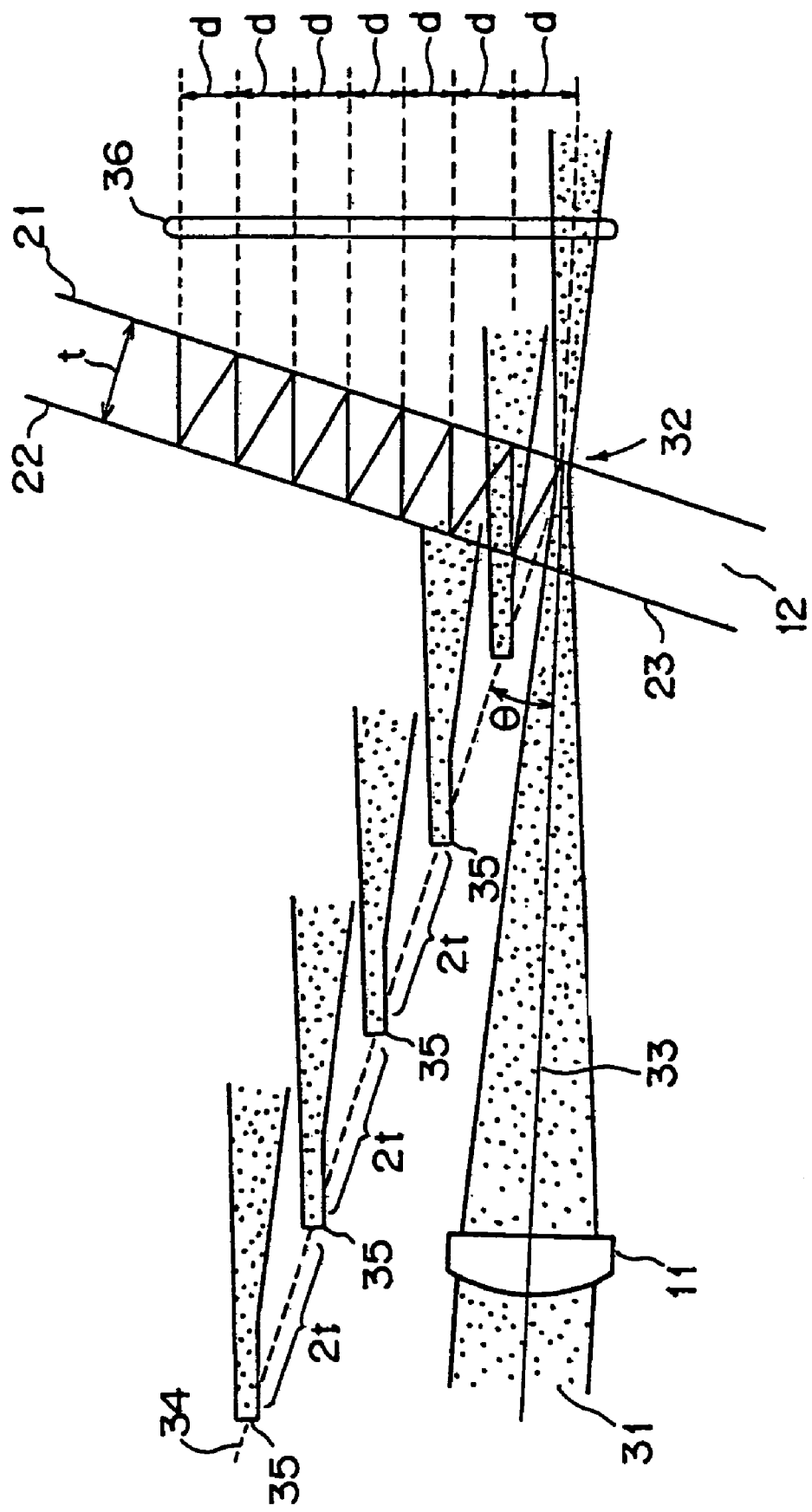
FIG. 2 shows a virtually imaged phased array (VIPA).

FIG. 2 shows an example of a VIPA. The VIPA shown in FIG. 2 comprises a cylindrical lens 11, and a glass plate 12 having the thickness of t. For example, the reflectivity of the reflection coating 21 is about 95%, and the reflectivity of the reflection coating 22 is about 100%. An incident window 23 is formed on the surface of the glass plate 12. The reflectivity of the incident window 23 is nearly 0%.

The input light 31 converges along a focal line 32 through the incident window 23 using the cylindrical lens 11, and multiple reflection occurs between the reflection coating 21 and 22. The width of the focal line 32 is referred to as a beam waist of the input light 31. There is a small inclination angle θ between an optical axis 33 of the input light 31 and a normal 34 of the glass plate 12.

At the first reflection on the reflection coating 21, 5% of the light passes through the reflection coating 21, and diverges after the beam waist. In addition, 95% of the light is reflected toward the reflection coating 22. After the light is reflected by the reflection coating 22, it reaches again the reflection coating 21 with its position shifted by the distance of d. Then, 5% of the light passes through the reflection coating 21. By repeating the above mentioned reflection and transmission, the light is split into a number of paths which have a constant displacement d.

The beam at each path diverges from a virtual image 35 of the beam waist. The virtual images 35 are positioned at constant intervals of 2t along the normal 34. The beams from the virtual images 35 interfere each other, and form collimated light 36 propagated in different directions depending on the wavelength of the input light 31, thereby generating angular dispersion which depends on the wavelength.

The displacement of optical paths is expressed by d=2t·sin θ, and the difference between path lengths of adjacent beams is computed by 2t·cos θ. The angular dispersion is proportional to the rate of these two values, that is, cot θ. As a result, the VIPA generates considerably large angular dispersion. As clearly shown in FIG. 2, the term "VIPA" is generated from the array of the virtual images 35.

FIG. 3 shows an example of a VIPA type compensator using the VIPA. The compensator shown in FIG. 3 comprises, in addition to the cylindrical lens 11 and the glass plate 12, a circulator 41, lenses 42 and 43, and a mirror 44.

The circulator 41 receives input light from an input fiber 51, and provides the light for the lens 42. The input light is collimated by the lens 42, passes through the cylindrical lens 11, and is focused onto a line on the glass plate 12. After the light passes through the glass plate 12, it is focused onto the mirror 44 through the lens 43, reflected by the mirror 44, and then returned to the glass plate 12 through the lens 43.

After the light has been returned to the glass plate 12, it is multiple-reflected in the glass plate 12, and is output from the incident window 23 shown in FIG. 2. The output light is received by the circulator 41 through the cylindrical lens 11 and the lens 42, and is output to an output fiber 52.

Thus, the light input to the VIPA is output from the VIPA, reflected by the mirror 44, and returned to the VIPA. The light reflected by the mirror 44 passes in the opposite direction of the path. Since the different wavelength elements of the light have respective focal points at different points on the mirror 44, they pass along different distances, thereby generating wavelength dispersion.

If the thickness t of the glass plate 12 is appropriately adjusted, substantially equal dispersion can be assigned to a number of channel wavelengths of the WDM optical transmission system. In addition, the amount of dispersion can be variable by mechanically changing the relative positional relation between the glass plate 12 and the set of the lens 43 and the mirror 44. The configuration of the VIPA type compensator shown in FIG. 3 is only an example, and many other configurations of the VIPA type compensator can be applied to the present embodiment, such as those described in the various documents incorporated herein by reference.

Since a VIPA type compensator can have variable wavelength dispersion to be applied to input light in the range of, for example, ±5000 ps/nm, the amount of compensation can be correctly set depending on the wavelength dispersion of a line fiber. However, the VIPA type compensator cannot compensate for the dispersion slope of the line fiber.

Then, the dispersion slope of the line fiber is compensated for using the DCF, and the difference between the wavelength dispersion of the line fiber and the amount of the dispersion compensation of the DCF is compensated for using a VIPA type compensator, thereby reducing a setting error in the amount of compensation of the wavelength dispersion.

If the dispersion slope cannot be sufficiently compensated for by a DCF of the length corresponding to the wavelength dispersion of a line fiber, then the length of the DCF is set long enough corresponding to the dispersion slope of the line fiber. Then, the excess wavelength dispersion of the DCF is inversely compensated for by a VIPA type compensator. Thus, the amount of compensation of the wavelength dispersion and the dispersion slope can be more correctly adjusted to the line fiber.

Figure 4:
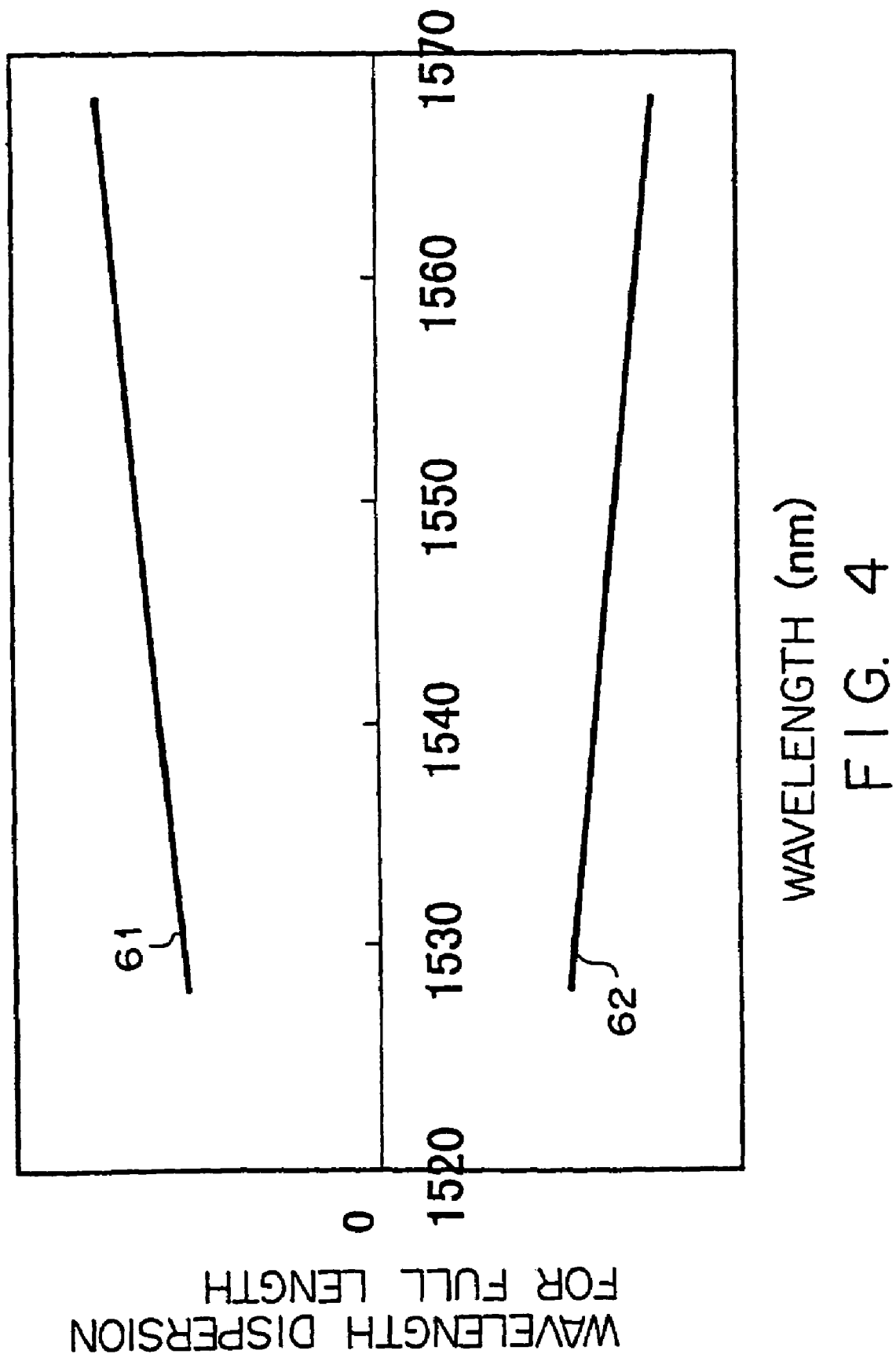
FIG. 4 shows an ideal dispersion compensation.

FIG. 4 shows the ideal dispersion compensation for a typical line fiber. In a shape 61 of the wavelength dispersion of a line fiber, the wavelength dispersion has a positive value, and becomes larger as the wavelength gets longer. A shape 62 indicates the wavelength dispersion of an ideal dispersion compensator for completely compensating for the wavelength dispersion, and is symmetrical to the shape 61 with respect to the straight line on which the wavelength dispersion equals zero. The amount of the dispersion compensation of the shape 62 has a negative value, and becomes smaller as the wavelength gets longer.

Figure 5:
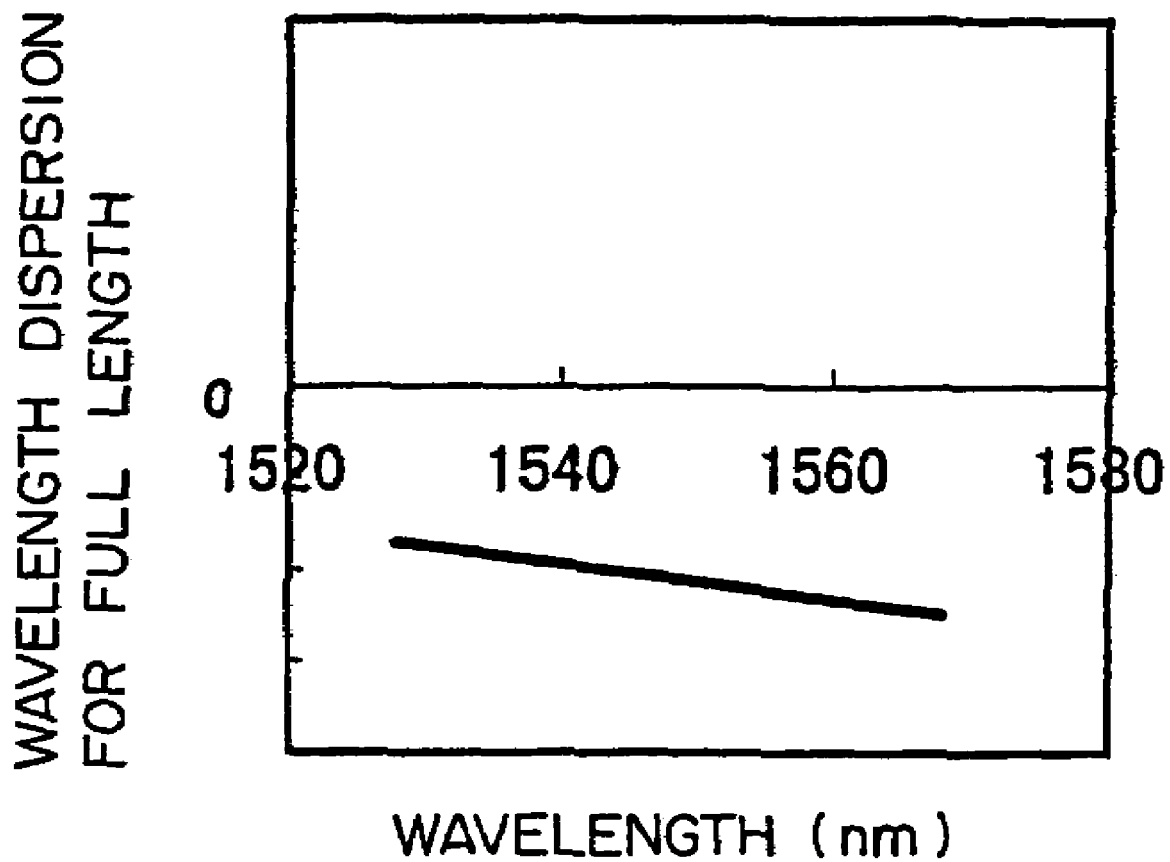
FIG. 5 shows the dispersion compensation by a dispersion compensation fiber (DCF).
Figure 6:
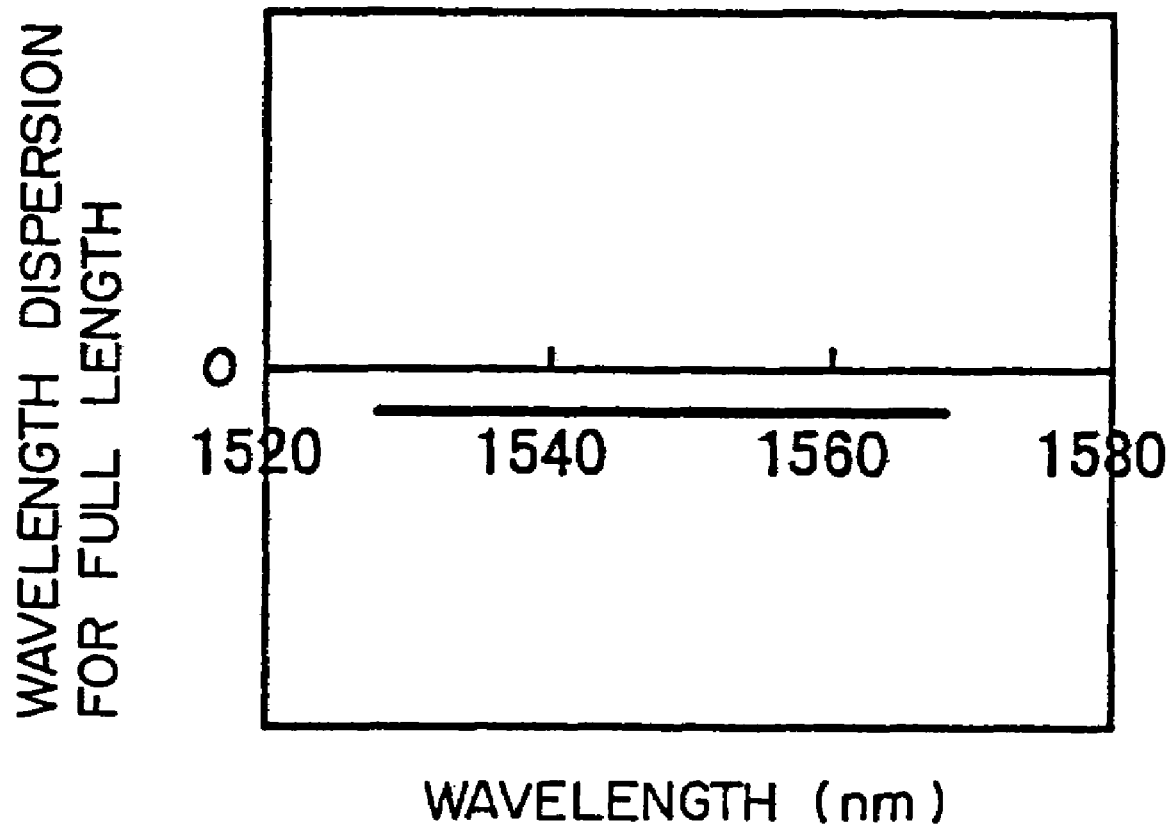
FIG. 6 shows the dispersion compensation by a VIPA type compensator.

On the other hand, the shapes of the wavelength dispersion of the typical DCF and the VIPA type compensator are shown in FIGS. 5 and 6, respectively. For the DCF as shown in FIG. 5, the shape of the wavelength dispersion has a negative inclination. However, for the VIPA type compensator shown in FIG. 6, it is substantially flat.

Figure 7:
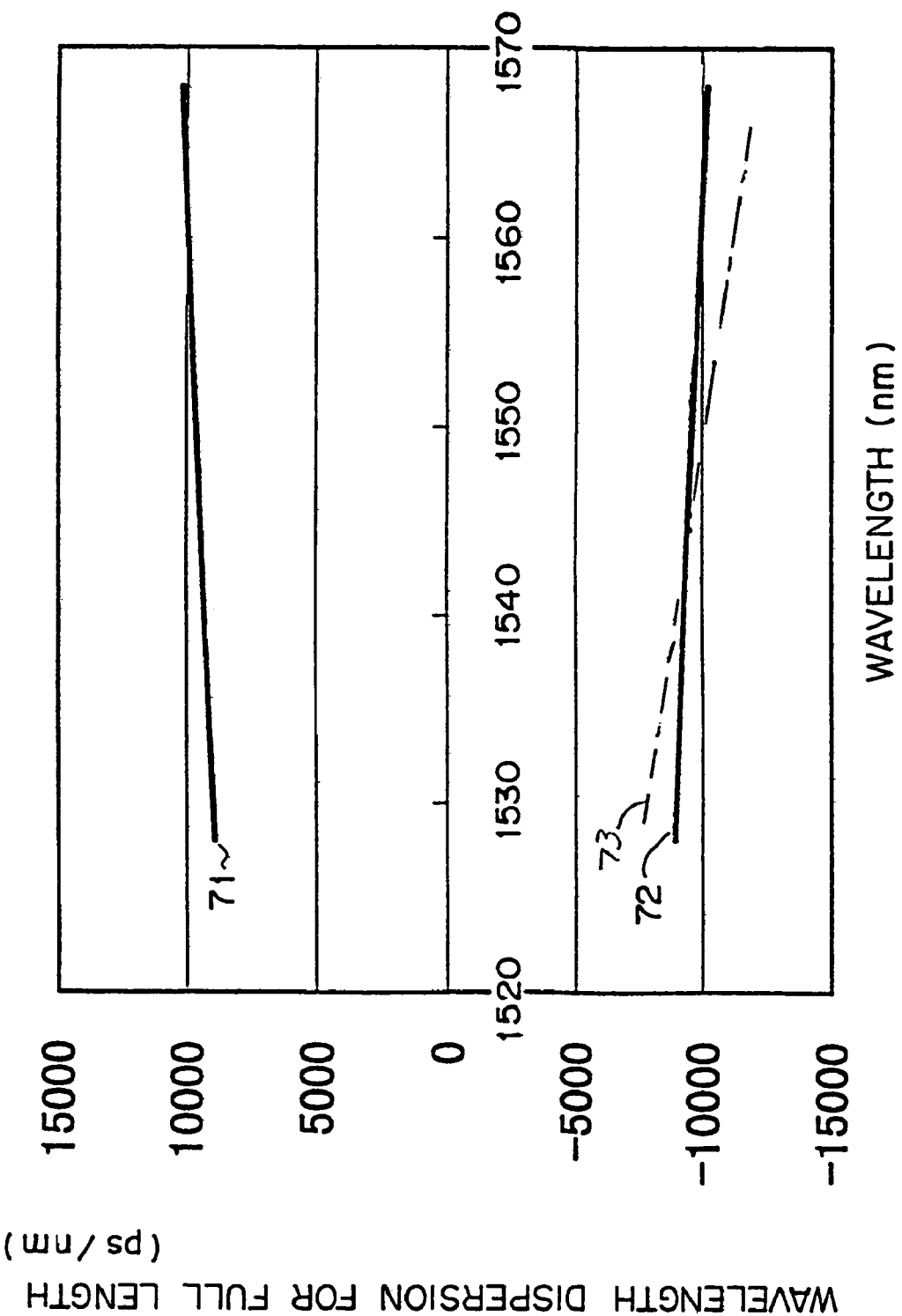
FIG. 7 shows the wavelength dispersion of a single mode fiber (SMF) line fiber.

FIG. 7 shows the wavelength dependence of the wavelength dispersion of a normal single mode fiber (SMF) line fiber (1.3 μm zero-dispersion fiber). In FIG. 7, a shape 71 indicates the wavelength dispersion of the SMF line fiber, and a shape 72 indicates the wavelength dispersion of a corresponding ideal dispersion compensator. A shape 73 of a broken line indicates the wavelength dispersion of a corresponding DCF.

Thus, in the case of a 1.3 μm zero-dispersion fiber, a dispersion compensation, which is close to that of the ideal dispersion compensator and includes the compensation of the dispersion slope, can be performed by an appropriate DCF. The amount of the dispersion compensation can be closer to the shape 72 by combining the DCF with the VIPA type compensator.

Figure 8:
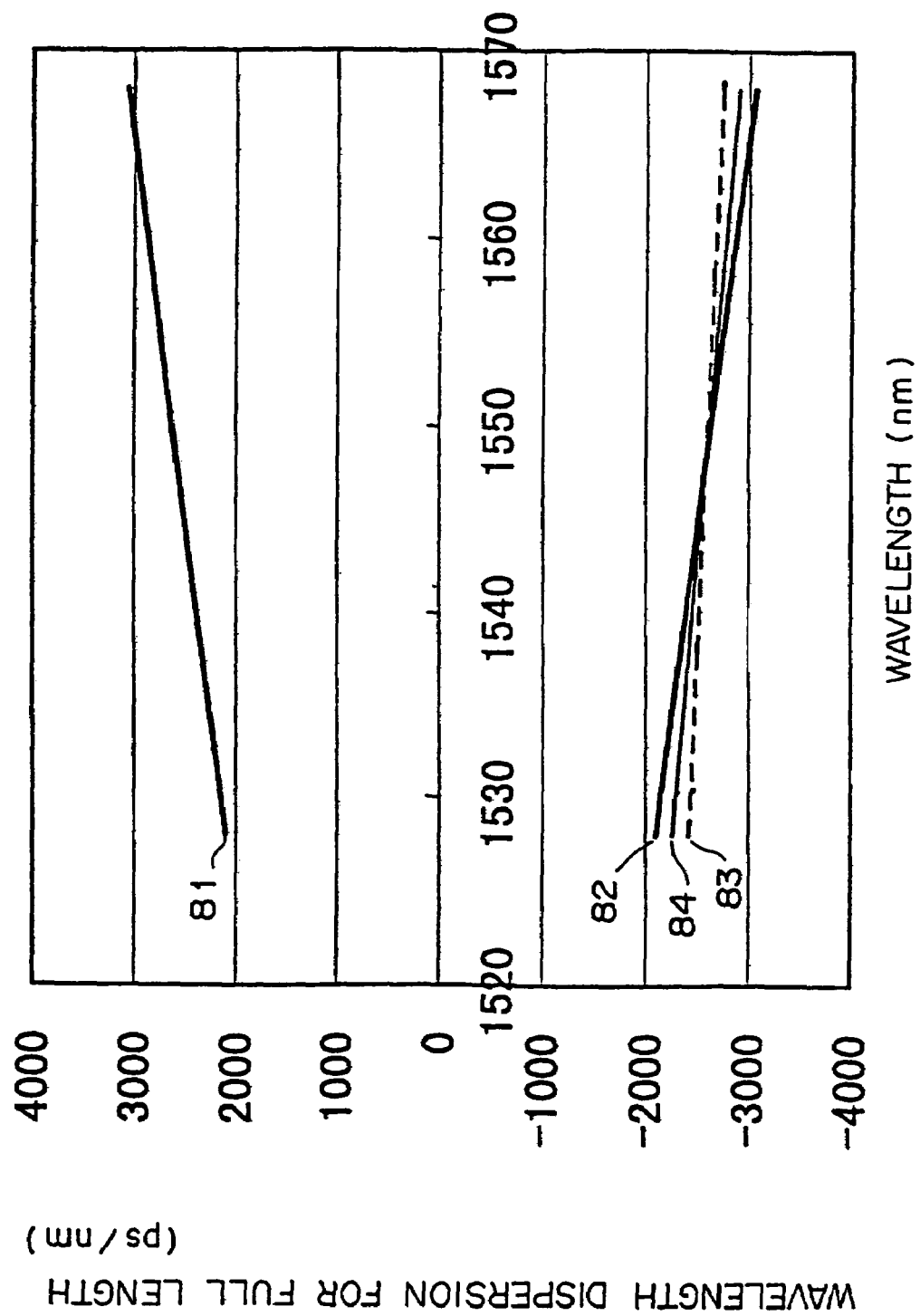
FIG. 8 shows the wavelength dispersion of a non-zero dispersion shifted fiber (NZ-DSF) line fiber.

FIG. 8 shows the wavelength dependence of the wavelength dispersion of a non-zero-dispersion shifted fiber (NZ-DSF) line fiber. In FIG. 8, a shape 81 indicates the wavelength dispersion of the NZ-DSF line fiber, and a shape 82 indicates the wavelength dispersion of a corresponding ideal dispersion compensator. A shape 83 of a broken line indicates the wavelength dispersion of a corresponding DCF.

Thus, in the case of the NZ-DSF line fiber, the dispersion slope cannot be sufficiently compensated for using the DCF with a part of dispersion remaining. However, if the DCF are combined with the VIPA type compensator, for example, the wavelength dispersion of a shape 84 can be obtained, and the amount of the dispersion compensation can be close to the shape 82.

By referring to FIGS. 9 through 13, the configuration of the dispersion compensation apparatus obtained by combining a DCF with a VIPA type compensator is described below in detail.

FIG. 9 shows a basic dispersion compensation apparatus. The dispersion compensation apparatus shown in FIG. 9 comprises an input terminal 91, a VIPA type compensator 92, a DCF 93, and an output terminal 94, and is provided at an appropriate position in the optical transmission system including, for example, in a transmission device and/or a reception device. Signal light is input from the input terminal 91, passes through the VIPA type compensator 92 and the DCF 93, and is output from the output terminal 94. Thus, the dispersion slope of a line fiber is compensated for by the DCF 93, and the portion of the dispersion characteristic independent of the wavelength is compensated for by the VIPA type compensator 92. The order of the VIPA type compensator 92 and the DCF 93 can be changed. In some embodiments of the present invention, the DCF 93 and the VIPA type compensator 92 would be housed in the same enclosure 95, and sold together as a dispersion compensating unit.

A process of performing the dispersion compensation can selected from the following "first" and "second" processes, depending on whether or not the DCF 93 can completely compensate for the dispersion slope of the line fiber.

Figure 10:
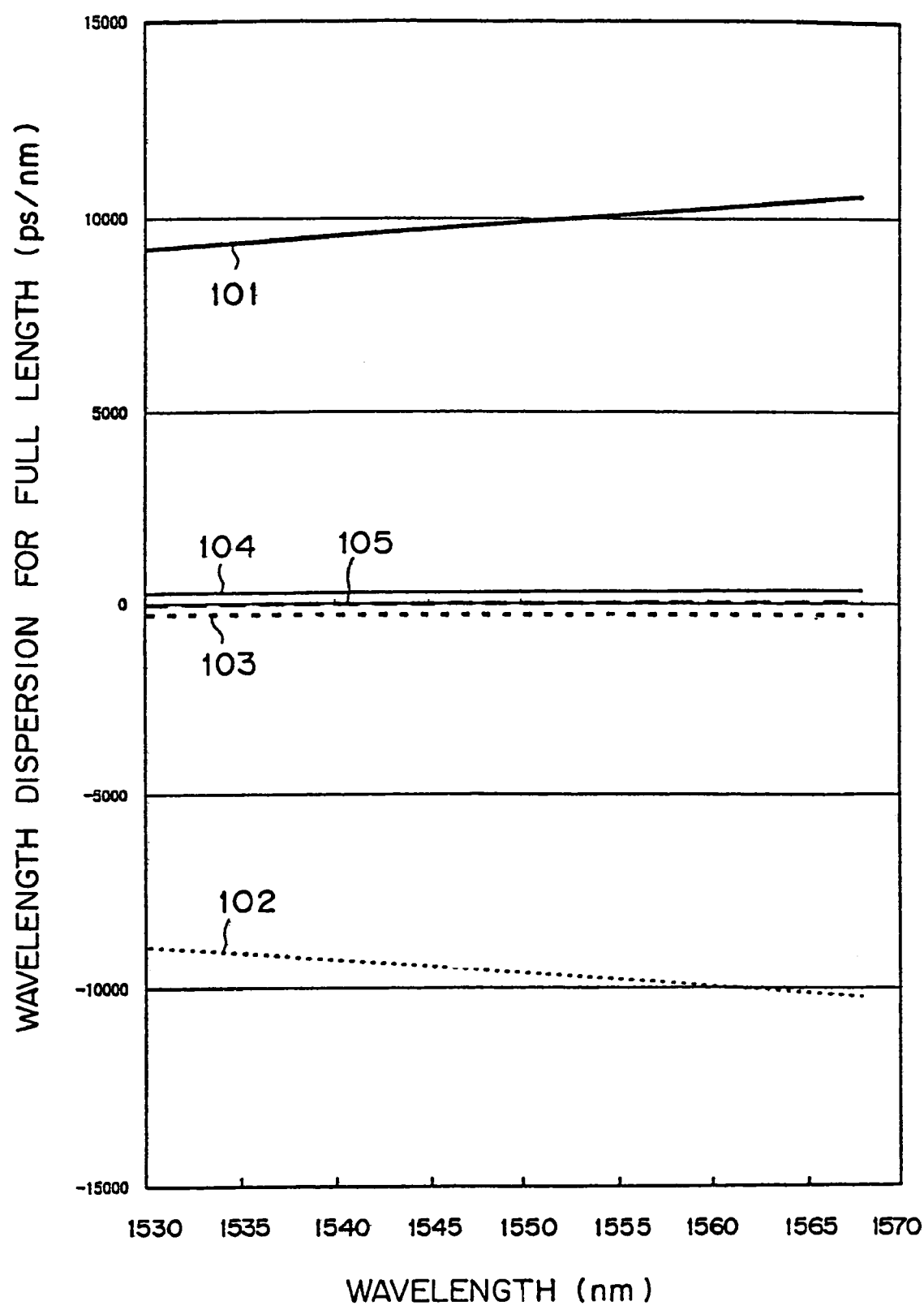
FIG. 10 shows the dispersion compensation of an SMF line fiber.

A "first" process would typically be used where the dispersion slope of the DCF 93 is sufficiently large when it is compared with the dispersion slope of the line fiber For example, if a normal SMF line fiber of 600 km is used, the characteristic of the dispersion compensation by a dispersion compensation apparatus is as shown in FIG. 10. In FIG. 10, a shape 101 indicates the wavelength dispersion of a line fiber, a shape 102 indicates the wavelength dispersion of the DCF 93, and a shape 103 indicates the wavelength dispersion of the VIPA type compensator 92.

In this case, since the wavelength dispersion and the dispersion slope of the DCF 93 substantially completely cancel the wavelength dispersion and the dispersion slope of the line fiber, a flat characteristic as a shape 104 can be obtained by adding up the wavelength dispersion of the line fiber and the DCF 93. If the wavelength dispersion of the VIPA type compensator 92 is added to the above mentioned characteristic, then the characteristic of a shape 105 can be obtained, and the wavelength dispersion and the dispersion slope can be substantially 0. In this case, the VIPA type compensator 92 adds negative wavelength dispersion.

Figure 11:
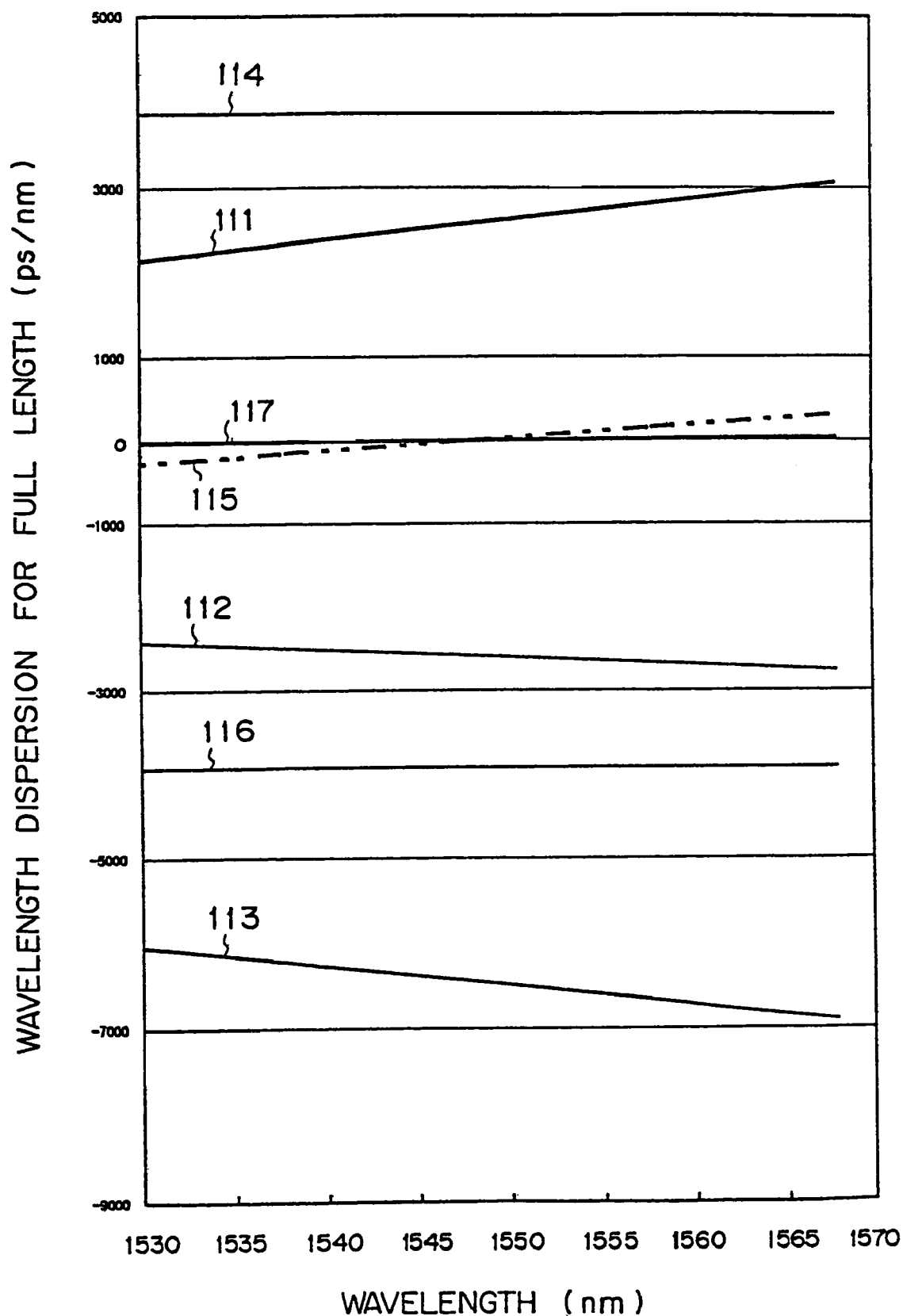
FIG. 11 shows the dispersion compensation of an NZ-DSF line fiber.

A "second" process would typically be used where the dispersion slope of the DCF 93 is insufficient as compared with the dispersion slope of a line fiber For example, if a normal NZ-DSF line fiber of 600 km is used, the characteristic of the dispersion compensation by a dispersion compensation apparatus is as shown in FIG. 11. In FIG. 11, a shape 111 indicates the wavelength dispersion of a line fiber, and a shape 112 indicates the wavelength dispersion of the DCF 93 when the absolute value of the wavelength dispersion of the DCF 93 matches the wavelength dispersion of the line fiber. A shape 113 indicates the wavelength dispersion of the DCF 93 when the dispersion slope of the DCF 93 matches the dispersion slope of the line fiber. A shape 114 indicates the wavelength dispersion of the VIPA type compensator 92.

In this case, when the wavelength dispersion of line fiber and the wavelength dispersion of the DCF of the shape 112 are added up, the characteristic of a shape 115 is obtained and dispersion slope of the line fiber cannot be canceled.

Therefore, using the DCF having the characteristic of the shape 113, the wavelength dispersion of the line fiber and the wavelength dispersion of the shape 113 are added up. As a result, a flat characteristic as a shape 116 can be obtained. When the wavelength dispersion of the VIPA type compensator 92 is furthermore added to the characteristic, the characteristic of shape 117 can be obtained, thereby setting both wavelength dispersion and dispersion slope to substantially zero. In this "second" process, unlike in the "first" process, the VIPA type compensator 92 adds the positive wavelength dispersion.

Assume that, as a practical example of the first process, above, a normal 1.3 µm zero-dispersion fiber having the following characteristic with a wavelength λ is used as a line fiber.

wavelength dispersion: +16.5 ps/nm/km (λ=1550 nm)
dispersion slope: +0.055 ps/nm²/km (λ=1550 nm)

In this case, for example, the DCF having the following characteristic is used.

wavelength dispersion: −80 ps/nm/km (λ=1550 nm)
dispersion slope: −0.3 ps/nm²/km (λ=1550 nm)

The wavelength dispersion of the above mentioned line fiber (100 km) is +16.5×100=+1650 ps/nm (λ=1550 nm), and the dispersion slope is +0.055×100=+5.5 ps/nm² (λ=1550 nm). Therefore, the length of the DCF required to completely remove the dispersion slope is 5.5/0.3=18.3 (km).

At this time, since the wavelength dispersion of the DCF is −80×18.3=−1464 (ps/nm), the wavelength dispersion of +1650−1464=+186 (ps/nm) remains. Therefore, if the wavelength dispersion of the VIPA type compensator is adjusted to be set to −186 ps/nm, both wavelength dispersion and dispersion slope can be removed.

Furthermore, assume that, as a practical example of the second process, above, a normal NZ-DSF having the following characteristic with a wavelength λ is used as a line fiber.

wavelength dispersion: +4.3 ps/nm/km (λ=1550 nm)
dispersion slope: +0.04 ps/nm²/km (λ=1550 nm)

In this case, for example, as in the case (1) above, the DCF having the following characteristic is used.

wavelength dispersion: −80 ps/nm/km (λ=1550 nm)
dispersion slope: −0.3 ps/nm²/km (λ=1550 nm)

The wavelength dispersion of the above mentioned line fiber (100 km) is +4.3×100=+430 ps/nm (λ=1550 nm), and the dispersion slope is +0.04×100=+4.0 ps/nm² (λ=1550 nm). Therefore, the length of the DCF required to completely remove the dispersion slope is 4.0/0.3=13.3 (km).

At this time, since the wavelength dispersion of the DCF is −80×13.3=−1064 (ps/nm), the wavelength dispersion of +430−1064 =−634 (ps/nm) remains. Therefore, if the wavelength dispersion of the VIPA type compensator is adjusted to be set to +634 ps/nm, both wavelength dispersion and dispersion slope can be removed.

As described above, since the variable range of the VIPA type compensator is very wide, a configuration for the dispersion compensation of the whole optical transmission system can be adopted using the characteristic of the variable range.

FIG. 12 shows an example of the above mentioned optical transmission system. The optical transmission system shown in FIG. 12 comprises a transmission device 121, one or more relay devices 122, a reception device 123, and line fibers 124 connecting these devices. The transmission device 121 comprises a transmitter 131 and the DCF 132, the relay device 122 comprises the DCF 132, and the reception device 123 comprises the VIPA type compensator 133 and a receiver 134. Thus, the DCF 132 is provided for the transmission device 121 and each of the relay devices 122, and the VIPA type compensator 133 is provided for the reception device 123.

Assume that a normal 1.3 µm zero-dispersion fiber having the following characteristic with a wavelength λ is used as the line fiber 124, and the DCF having the above mentioned characteristic is used as the DCF 132.

wavelength dispersion: +16.5±0.5 ps/nm/km (λ=1550 nm)
dispersion slope: +0.055 ps/nm²/km (λ=1550 nm)

Assuming that the number of the relay devices 122 is three, and four spans (stages) of the 100 km line fibers 124 are used, the length of the DCF per span required to compensate for a dispersion slope is 18.3 km as described above.

In addition, since the wavelength dispersion of four spans of line fibers is +16.5±0.5×100×4=+6600±200 ps/nm (λ=1550 nm), and the wavelength dispersion of four spans of the DCFs is −80×18.3×4=−5856 (ps/nm), the wavelength dispersion of +6600±200−5856=+744±200 (ps/nm) remains. Therefore, if the wavelength dispersion of the VIPA type compensator is adjusted to be set to −744±200 ps/nm, then the wavelength dispersion and the dispersion slope can be correctly compensated for.

Thus, when the NZ-DSF having the above mentioned characteristic is used as the line fiber 124, the length of the DCF per span required to compensate for a dispersion slope is, 13.3 km as described above.

In addition, since the wavelength dispersion of four spans of line fibers is +4.3×100×4=+1720 ps/nm (λ=1550 nm), and the wavelength dispersion of four spans of the DCFs is −80× 13.3 ×4=−4256 (ps/nm), the wavelength dispersion of +1720−4256=2536 (ps/nm) remains. Therefore, if the wavelength dispersion of the VIPA type compensator is adjusted to be set to +2536 ps/nm, then both wavelength dispersion and dispersion slope can be removed.

In this case, however, a large amount of wavelength dispersion has been accumulated before the signal light reaches the reception device from the transmission device, which is not desired. Therefore, instead of canceling the dispersion slope of the line fiber by the DCF, it is considered to adjust the length of the DCF such that the wavelength dispersion of the line fiber can be canceled.

Since the wavelength dispersion per span of the above mentioned line fiber is +430 ps/nm (λ=1550 nm), the length of the DCF required to completely remove the wavelength dispersion is 430/80=5.4 (km). Therefore, the length of the DCF per span is set to 5.4 km, and the wavelength dispersion of the VIPA type compensator is adjusted to 0 ps/nm, thereby removing the wavelength dispersion. However, in this case, the dispersion slope cannot be completely removed.

If the length of the DCF per span is not changed depending on the length of the line fiber, the dispersion slope of the 5.4 km DCF is −0.3×5.4=1.62 (ps/nm²). Therefore, when the length of the line fiber per span is 1.62/0.04=40.5 (km), the dispersion slope can be completely removed.

At this time, since the wavelength dispersion of four spans of line fibers is +4.3×40.5×4=697 ps/nm (λ=1550 nm), and the wavelength dispersion of four spans of the DCFs is −80× 5.4 ×4=−1728 (ps/nm), the wavelength dispersion of +697−1728=−1031 (ps/nm) remains. Therefore, if the wavelength dispersion of the VIPA type compensator is adjusted to be set to +1031 ps/nm, then both wavelength dispersion and dispersion slope can be removed.

Figure 13:
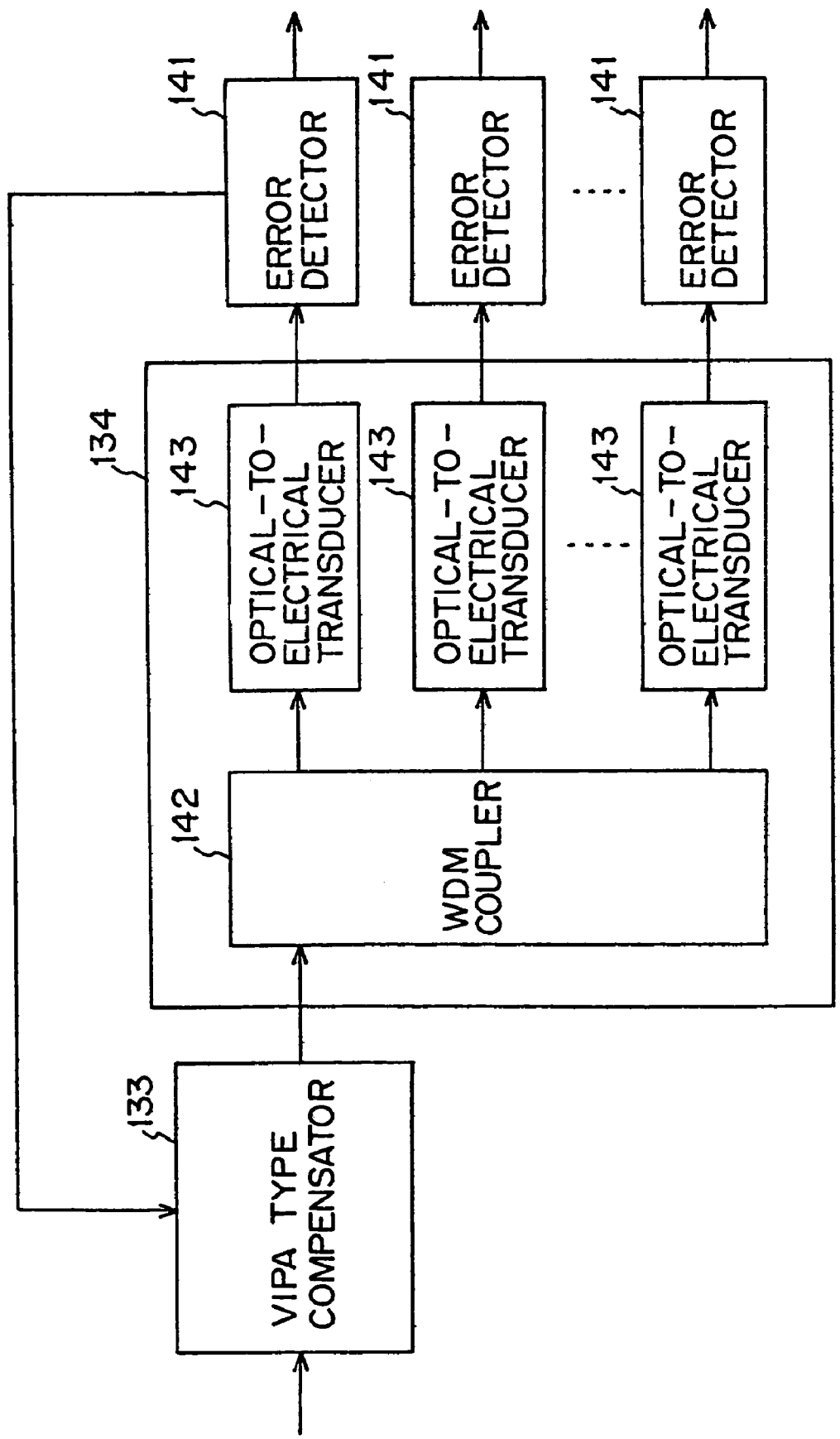
FIG. 13 shows a reception device.

FIG. 13 shows an example of the configuration of the reception device 123. The reception device shown in FIG. 13 comprises the VIPA type compensator 133, the receiver 134, and an error detector 141. The receiver 134 comprises a WDM coupler 142 and a plurality of optical-to-electrical transducers 143.

The WDM coupler 142 branches signal light output from the VIPA type compensator 133, and the optical-to-electrical transducer 143 converts the optical signal into an electric signal. The error detector 141 detects an error in the electric signal, and outputs a control signal to the VIPA type compensator 133. According to the control signal, the wavelength dispersion of the VIPA type compensator 133 is adjusted such that the wavelength dispersion of the signal light can be compensated for. Thus, a transmission device and a relay device are provided with a DCF, and a VIPA type compensator is provided only for the reception device, thereby easily adjusting the amount of dispersion compensation.

The specific embodiment of receiver 134 in FIG. 13 is only one specific example of a receiver. The present invention is not limited to use with any specific type or configuration of receiver.

According to the above mentioned embodiment, the characteristic of only the VIPA type compensator 133 is variable. However, the characteristic of a DCF can also be variable.

Figure 14:
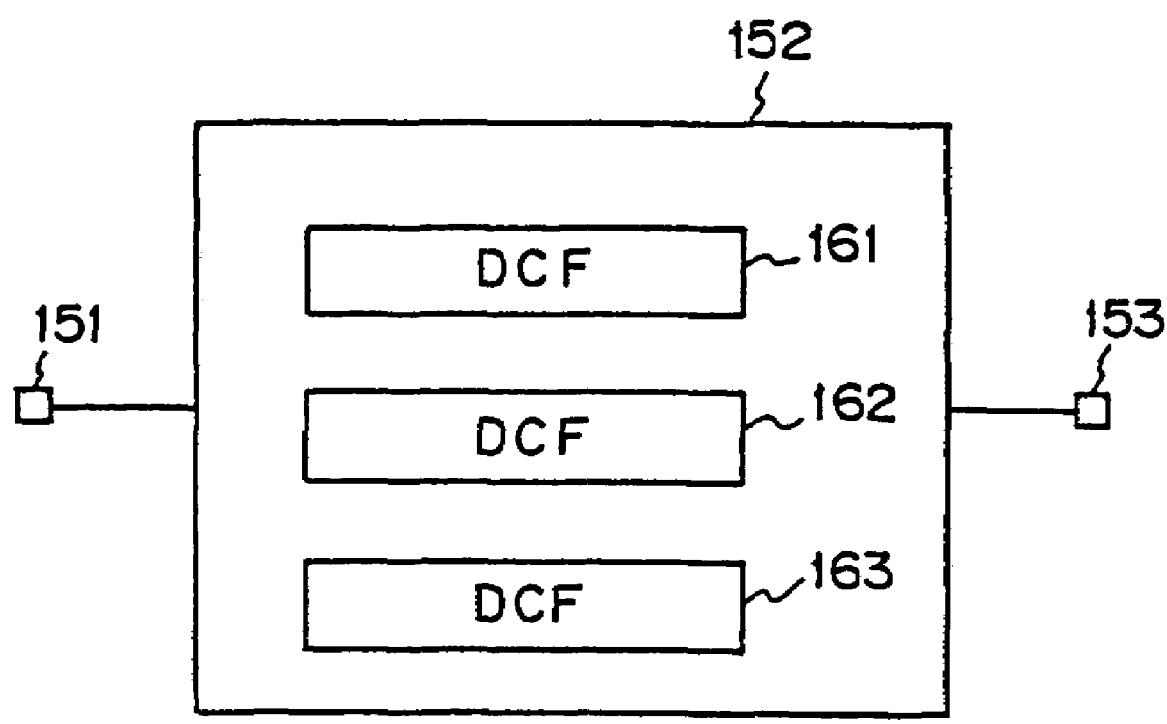
FIG. 14 shows a variable dispersion compensation fiber (DCF) compensator.

For example, FIG. 14 shows a variable DCF compensator. The compensator shown in FIG. 14 comprises an input terminal 151, a DCF switch unit 152, and an output terminal 153.

The DCF switch unit 152 comprises three DCFs 161, 162, and 163 having different characteristics, and can select any of them. Thus, it is possible to switch the DCFs depending on the characteristic of a line fiber, and signal light input from the input terminal 151 is output from the output terminal 153 through a selected DCF.

The wavelength dispersion and the dispersion slope per unit length of the DCFs 161, 162, and 163 can be either identical or different. When they are identical, three DCFs having different characteristics can be obtained by changing the length of each DCF.

By combining a variable DCF compensator with a VIPA type compensator, a dispersion compensation apparatus capable of adjusting both wavelength dispersion and dispersion slope can be realized.

Figure 15:
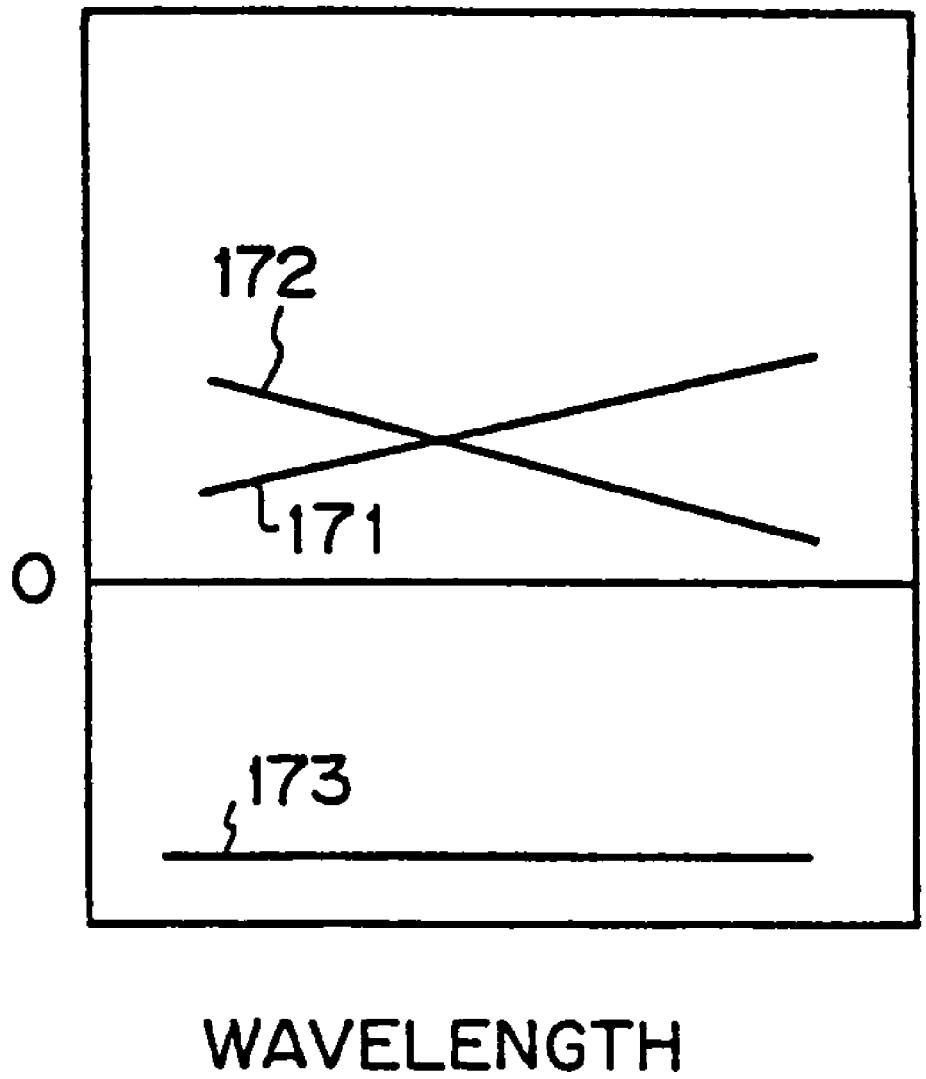
FIG. 15 shows the case in which the wavelength dispersion of a DCF is positive.

The wavelength dispersion of a DCF is not limited to a negative value, but can be a positive value. For example, as shown in FIG. 15, assume that a DCF having positive wavelength dispersion of a shape 172 is used for a line fiber having wavelength dispersion of a shape 171. In this case, a VIPA type compensator having negative wavelength dispersion of a shape 173 can be used.

In addition, the wavelength dispersion of a line fiber is not limited to a positive value, but can be a negative value. When the wavelength dispersion of a line fiber has a negative value, the sign of the wavelength dispersion of the dispersion compensator can be inverted.

Figure 16:
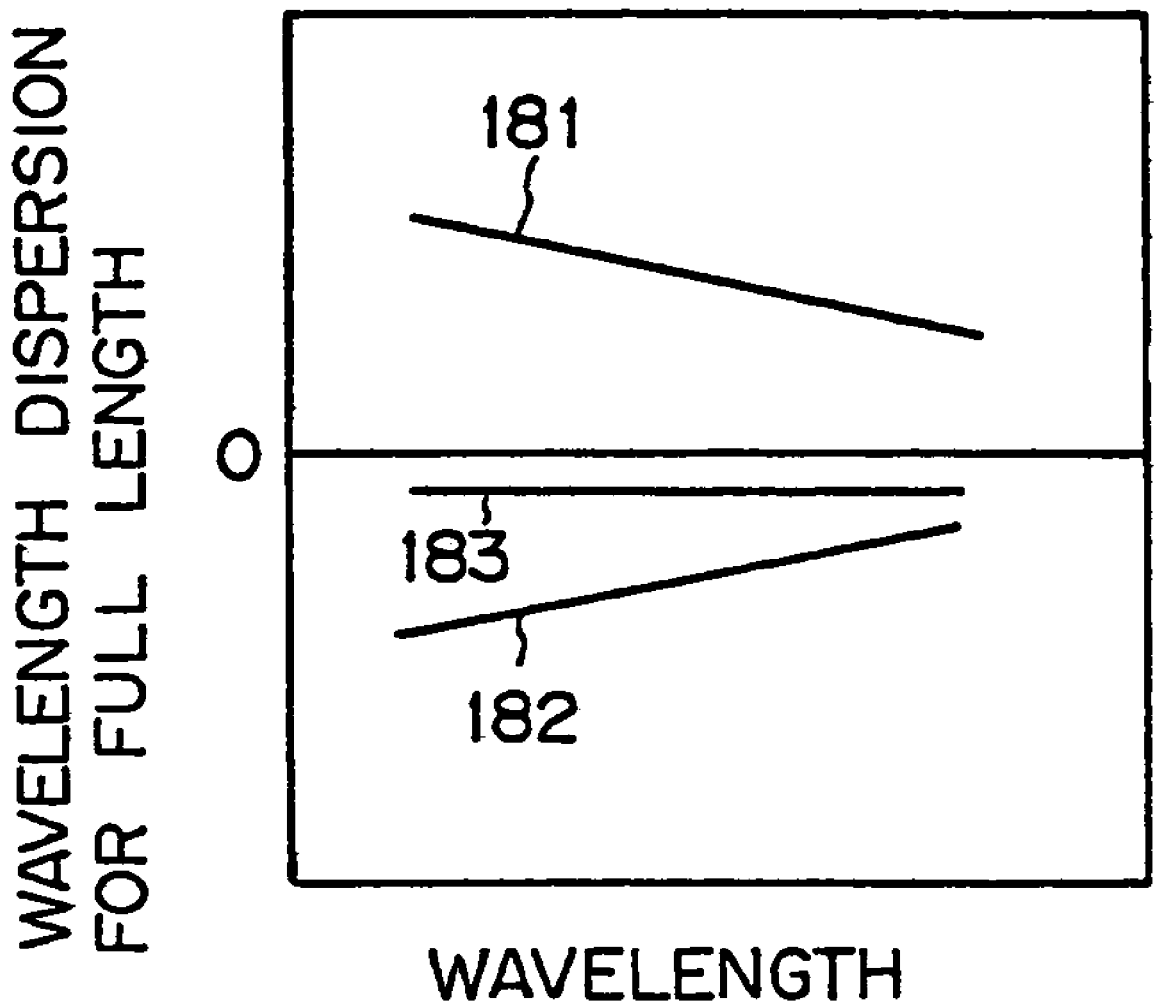
FIG. 16 shows the case in which the dispersion slope of a line fiber is negative.

In addition, the dispersion slope of a line fiber is not limited to a positive value, but can be a negative value. For example, as shown in FIG. 16, for a line fiber having a negative dispersion slope of a shape 181, a DCF having a positive dispersion slope of a shape 182 and a VIPA type compensator having wavelength dispersion of a shape 183 can be used.

Furthermore, it is not necessary to always use a DCF and a VIPA type compensator as first and second compensators, but any two types of compensators having different characteristics about wavelength dispersion can be used. For example, a grating type compensator using fiber grating can be a substitute for a DCF or a VIPA type compensator.

According to the present invention, the wavelength dispersion and the dispersion slope of a line fiber can be collectively compensated for by combining two types of compensators having different characteristics. Furthermore, depending on the uneven wavelength dispersion and dispersion slope of a line fiber, the characteristic of a dispersion compensation apparatus can be variable, thereby reducing setting errors in the amount of compensation.

Figure 17:
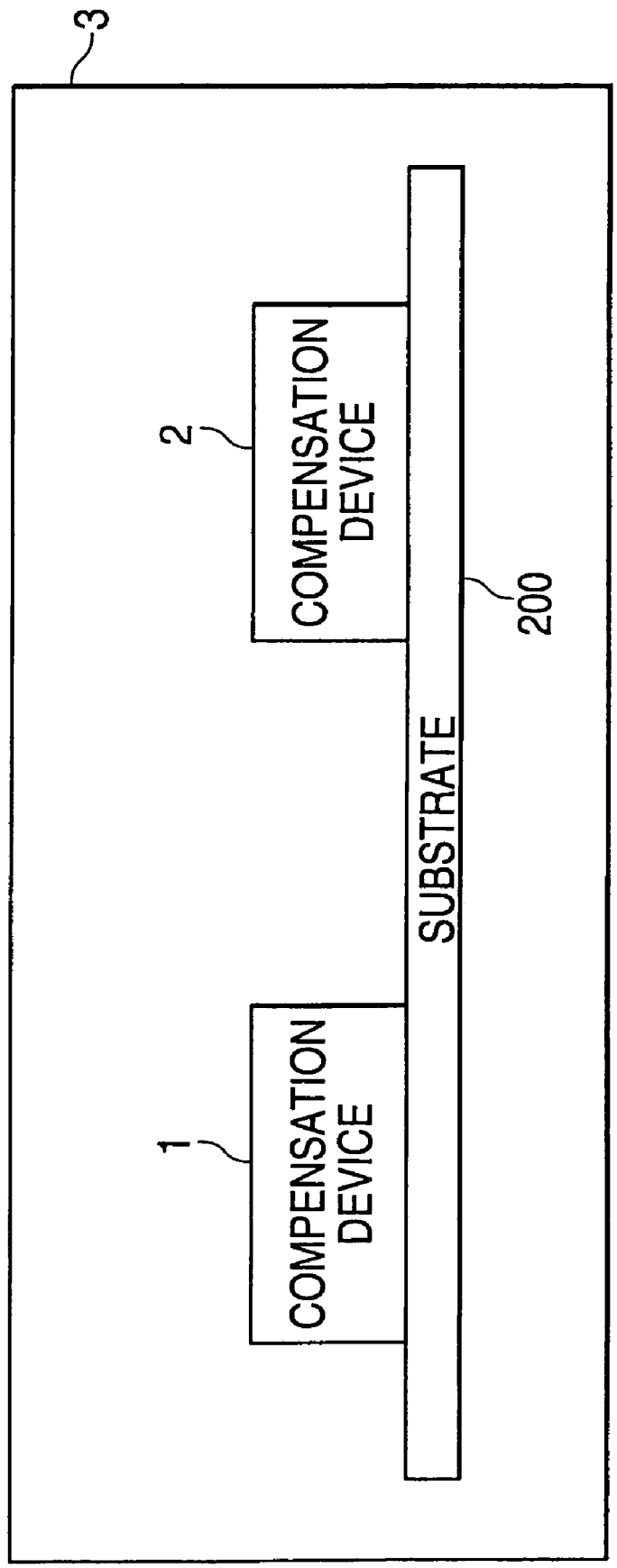
FIG. 17 shows dispersion compensation devices on the same substrate.

FIG. 1 shows compensation devices 1 and 2 which, in some embodiments, may be housed in the same enclosure 3. Moreover, as indicated by FIG. 17, in some embodiments of the present invention, compensation devices 1 and 2 might be fixed together on the same substrate 200. Of course, FIG. 17 is not drawn to scale. As an additional example, the VIPA type compensator 92 and the DCF 93 in FIG. 9 might, for example, be fixed together on the same substrate.

According to various embodiments of the present invention, the dispersion compensation apparatus includes a first compensation device and a second compensation device, and compensates for the wavelength dispersion of an optical transmission line such as a line fiber.

According to additional embodiments of the present invention, the first compensation device has a wavelength dispersion characteristic depending on a wavelength, and compensates for dispersion slope. The second compensation device has a constant wavelength dispersion characteristic for a plurality of wavelengths, and compensates for wavelength dispersion.

According to further embodiments of the present invention, the first compensation device has a wavelength dispersion characteristic depending on a wavelength, and compensates for the dispersion slope. The second compensation device has a variable wavelength dispersion characteristic, and compensates for the wavelength dispersion.

Further, according to embodiments of the present invention, a dispersion compensation apparatus includes a fiber-type compensation device and a virtually imaged phased array type compensation device. The fiber-type compensation device compensates for the wavelength dispersion and the dispersion slope of an optical transmission line. The virtually imaged phased array type compensation device compensates for the sum of the wavelength dispersion of the optical transmission line and the wavelength dispersion compensation of the fiber-type compensation device.

Although a few preferred embodiments of the present invention have been shown and described, it would be appreciated by those skilled in the art that changes may be made in theses embodiments without departing from the principles and spirit of the invention, the scope of which is defined in the claims and their equivalents.

What is claimed is:

1. An apparatus comprising:
    a first compensator compensating wavelength dispersion, the first compensator having a constant wavelength dispersion characteristic over a plurality of wavelengths; and
    a second compensator compensating wavelength dispersion after wavelength dispersion is compensated by the first compensator, wherein the first and second compensators together compensate for wavelength dispersion dependent on a respective wavelength of a transmission line,
    wherein the first compensator is a virtually imaged phased array (VIPA) dispersion compensator.

2. An apparatus as in claim 1, further comprising:
    a housing which houses, and thereby encloses, both the first and second compensators.

3. An apparatus as in claim 1, further comprising:
    a substrate on which both the first and second compensators are fixed.

4. An apparatus as in claim 2, further comprising:
    a substrate on which both the first and second compensators are fixed.

5. An apparatus as in claim 1, wherein the respective wavelength is the wavelength of a respective signal light included in a wavelength division multiplexed (WDM) light transmitted through the transmission line and including a plurality of signal lights at different wavelength multiplexed together.

6. An apparatus comprising:
    first means for compensating wavelength dispersion, the first means having a constant wavelength dispersion characteristic over a plurality of wavelengths; and
    second means for compensating wavelength dispersion after wavelength dispersion is compensated by the first means, wherein the first and second means together compensate for wavelength dispersion dependent on a respective wavelength of a transmission line,
    wherein the first means is a virtually imaged phased array (VIPA) dispersion compensator.

7. An apparatus as in claim 6, further comprising:
    a housing which houses, and thereby encloses, both the first means and the second means.

8. An apparatus comprising:
    a first compensator compensating for wavelength dispersion, the first compensator having a constant wavelength dispersion characteristic over a plurality of wavelengths; and
    a second compensator compensating for dispersion slope over the plurality of wavelengths after the compensation by the first compensator.

9. An apparatus as in claim 8, further comprising:
    a housing which houses, and thereby encloses, both the first and second compensators.

10. An apparatus as in claim 8, further comprising:
    a substrate on which both the first and second compensators are fixed.

11. An apparatus as in claim 9, further comprising:
    a substrate on which both the first and second compensators are fixed.

12. An apparatus as in claim 8, wherein the first and second compensators together compensate for dispersion of a respective wavelength of a respective signal light included in a wavelength division multiplexed (WDM) light transmitted through a transmission line and including a plurality of signal lights at different wavelength multiplexed together.

13. An apparatus as in claim 8, wherein the first compensator is a virtually imaged phased array (VIPA) dispersion compensator.

* * * * *